(12) United States Patent (10) Patent No.: US 8,035,545 B2
Pruett et al. (45) Date of Patent: Oct. 11, 2011

(54) VEHICULAR SURVEILLANCE SYSTEM USING A SYNTHETIC APERTURE RADAR

(75) Inventors: James A. Pruett, Allen, TX (US); Timothy E. Adams, Allen, TX (US); Christopher T. Moshenrose, Allen, TX (US); Jerry M. Grimm, Plano, TX (US)

(73) Assignee: Raytheon Company, Waltham, MA (US)

( * ) Notice: Subject to any disclaimer, the term of this patent is extended or adjusted under 35 U.S.C. 154(b) by 195 days.

(21) Appl. No.: 12/404,078

(22) Filed: Mar. 13, 2009

(65) Prior Publication Data

US 2010/0231441 A1 Sep. 16, 2010

(51) Int. Cl.
*G01S 13/00* (2006.01)
(52) U.S. Cl. ............................................. 342/25 R
(58) Field of Classification Search ............... 342/25 R; 296/24.3–26.15, 76
See application file for complete search history.

(56) References Cited

U.S. PATENT DOCUMENTS

| | | | |
|---|---|---|---|
| 4,866,446 A | 9/1989 | Hellsten | 342/25 |
| 5,485,384 A | 1/1996 | Falconnet | |
| 5,680,138 A | 10/1997 | Pritt | 342/169 |
| 5,969,662 A | 10/1999 | Hellsten | |
| 6,094,157 A | 7/2000 | Cowdrick | 342/22 |
| 6,216,540 B1 | 4/2001 | Nelson et al. | 73/633 |
| 6,255,981 B1 | 7/2001 | Samaniego | 342/25 |
| 6,441,772 B1 | 8/2002 | Hellsten et al. | 342/25 |
| 6,501,414 B2 | 12/2002 | Arndt et al. | |
| 6,611,226 B1 | 8/2003 | Jones et al. | |
| 6,633,253 B2 | 10/2003 | Cataldo | |
| 6,650,274 B1 | 11/2003 | Krikorian et al. | 342/25 |
| 6,653,970 B1 | 11/2003 | Mitra | |
| 6,690,318 B1 | 2/2004 | Tsunoda | |
| 6,727,841 B1 | 4/2004 | Mitra | |
| 6,741,201 B1 | 5/2004 | De Jongth et al. | 342/22 |
| 6,747,593 B1 | 6/2004 | Jaffer | 342/160 |
| 6,750,805 B1 | 6/2004 | Cameron | 342/90 |
| 6,756,935 B1 | 6/2004 | Cameron et al. | 342/90 |
| 6,859,169 B2 | 2/2005 | Jones et al. | |
| 6,864,828 B1 | 3/2005 | Golubiewski et al. | |
| 6,911,933 B1 | 6/2005 | Mutz et al. | 342/25 |
| 7,009,550 B2 | 3/2006 | Moeller-Jensen | 342/52 |

(Continued)

FOREIGN PATENT DOCUMENTS

GB 2168870 A 6/1986

(Continued)

OTHER PUBLICATIONS

PCT Notification of Transmittal of the International Search Report and the Written Opinion of the International Searching Authority, or the Declaration, with attached PCT International Search Report and Written Opinion of the International Searching Authority in International Application No. PCT/US2010/025832, filed Mar. 2, 2010, mailed Dec. 3, 2010 (15 pages).

(Continued)

*Primary Examiner* — Thomas Tarcza
*Assistant Examiner* — Timothy Brainard
(74) *Attorney, Agent, or Firm* — Baker Botts L.L.P.

(57) ABSTRACT

According to one embodiment, a system for gathering intelligence, surveillance, and reconnaissance information comprises a synthetic aperture radar that is housed within an enclosure coupled to a land vehicle. The synthetic aperture radar includes an antenna array that transmits and receives electro-magnetic radiation for generating images of objects around the land vehicle while the land vehicle is in motion.

17 Claims, 3 Drawing Sheets

U.S. PATENT DOCUMENTS

| | | | |
|---|---|---|---|
| 7,015,855 B1 | 3/2006 | Medl et al. ............... 342/25 |
| 7,050,909 B2 | 5/2006 | Nichols et al. | |
| 7,136,010 B2 | 11/2006 | Cirillo et al. ............ 342/25 |
| 7,154,434 B1 | 12/2006 | Sego ........................ 342/161 |
| 7,190,302 B2 | 3/2007 | Biggs | |
| 7,336,078 B1 * | 2/2008 | Merewether et al. ........ 324/326 |
| 7,385,515 B1 | 6/2008 | Owen et al. | |
| 7,414,706 B2 | 8/2008 | Nichols et al. | |
| 7,456,780 B1 | 11/2008 | Garren ..................... 342/25 |
| 7,498,968 B1 | 3/2009 | Bielek ...................... 342/25 |
| 7,536,365 B2 | 5/2009 | Aboutalib | |
| 7,764,220 B1 | 7/2010 | Samaniego ............... 342/25 |
| 2002/0175849 A1 | 11/2002 | Arndt et al. ............... 342/22 |
| 2006/0214835 A1 | 9/2006 | Lee et al. ................. 342/22 |
| 2006/0259219 A1 * | 11/2006 | Wakiyama et al. ............. 701/36 |
| 2006/0293854 A1 * | 12/2006 | Chiou et al. ................ 701/301 |
| 2007/0024489 A1 | 2/2007 | Cerwin ..................... 342/22 |
| 2007/0231156 A1 * | 10/2007 | Hong ....................... 416/241 R |
| 2008/0117098 A1 | 5/2008 | Johnson et al. ............. 342/25 |
| 2008/0246647 A1 | 10/2008 | Hellsten ..................... 342/22 |
| 2008/0272955 A1 | 11/2008 | Yonak et al. ............... 342/54 |
| 2009/0140913 A1 * | 6/2009 | Hildebrandt et al. ........... 342/70 |
| 2009/0207067 A1 | 8/2009 | Samaniego et al. ............ 342/22 |
| 2009/0323046 A1 * | 12/2009 | Tan et al. .................... 356/4.01 |

FOREIGN PATENT DOCUMENTS

| | | |
|---|---|---|
| JP | 61167888 A | 7/1986 |
| JP | 61194379 A | 8/1986 |
| WO | WO 2008010772 A1 * | 1/2008 |

OTHER PUBLICATIONS

Wang et al., "A Reconfiguarable, Scalable and Multifunctional Experimental AutoSAR and its Applications", Chinese Academy of Sciences, Beijing, P.R. China, Geoscience and remote sensing symposium, 2006, IGARSS 2006; IEEE International Conference, Jul. 1, 2006; pp. 3027-3029, XP031179659; ISBN: 9780-7803-9510-7.

Young-Kyun Kong et al., "An Experimental Automobile-based SAR/InSAR", NEX1 Future, Geoscience and remote sensing symposium 2005; IGARSS '05 proceedings, 2005 IEEE, International Seoul, Korea, Jul. 25-29, 2005, Piscataway, NJ, USA, IEEE, vol. 6, Jul. 25, 2005; pp. 4061-4064, XP)10848678; DOI 10.1109/IGARSS.2005.1525806; ISBN 978-0-7803-9050-8.

Tsuchihashi et al., "A Radar System for Underground Pipes Detection"; The Electric Power Co., Inc., Mitsubishi Electric Corp.; Electricity Distribution, 1989, CIRED 1989, 10th Int'l conference on Brighton, UK, London, UK, IEEE, Jan. 1, 1989, pp. 247-251, XP006517954; ISBN 978-0-85296-376-0.

Freeman, A.; Zink, M.; "An application of the Monopulse Principle to Determining Elevation Angles in SAR Images", Geoscience and Remote Sensing, IEEE Transactions on, vol. 32, Issue 3, May 1994, pp. 616-625.

*U.S. Patent and Trademark Office*, Formalities Letter, U.S. Appl. No. 12/428,280, filed Apr. 22, 2009, Raymond Samaniego, Date mailed May 14, 2009.

*U.S. Patent and Trademark Office*, Notice of Allowance and Fee(s) Due, U.S. Appl. No. 12/428,280, filed Apr. 22, 2009, Raymond Samaniego, Date Mailed Jan. 27, 2010.

* cited by examiner

VEHICULAR SURVEILLANCE SYSTEM USING A SYNTHETIC APERTURE RADAR

TECHNICAL FIELD OF THE DISCLOSURE

This disclosure generally relates to synthetic aperture radars, and more particularly, to a synthetic aperture radar that may be configured in a vehicle.

BACKGROUND OF THE DISCLOSURE

Radars detect remote objects by transmitting a beam of electro-magnetic energy and subsequently measuring reflected electro-magnetic energy from these objects. Synthetic aperture radars (SARs) are a special type of radar that uses signal processing techniques to generate two-dimensional images from objects that are moving relative to its antenna. A synthetic aperture radar utilizes movement of its antenna relative to objects to derive additional information about these objects that may otherwise not be obtained using stationary radars. This additional information may be combined by the synthetic aperture radar to generate useful imagery of various objects of interest.

SUMMARY OF THE DISCLOSURE

According to one embodiment, a system for gathering intelligence, surveillance, and reconnaissance information comprises a synthetic aperture radar that is housed within an enclosure coupled to a land vehicle.

The synthetic aperture radar includes an antenna array that transmits and receives electro-magnetic radiation for generating images of objects around the land vehicle while the land vehicle is in motion.

Some embodiments of the disclosure may provide numerous technical advantages. For example, one embodiment of the inverse synthetic aperture radar processing system may provide enhanced edge detection of targets than known inverse synthetic aperture radar processing systems. Significant elements of a particular target may reflect radar signals with relatively high mean values with a high level of variance. The inverse synthetic aperture radar processing system of the present disclosure processes high variance values in the received inverse synthetic aperture radar image to enhance details of the significant elements of the target. Thus, images may be derived having enhanced resolution over known inverse synthetic aperture radar image processing systems. In some embodiments, the enhanced inverse synthetic aperture radar image may provide a relatively accurate indication of the target's length, which may be useful for classification purposes.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Synthetic aperture radars generate imagery of objects using multiple return signals reflected from the objects during movement relative to an antenna of the synthetic aperture radar. In some cases, imagery provided by synthetic aperture radars may be superior to images provided by conventional photographic devices, such as cameras, that process visible light generated or reflected by objects. For example, synthetic aperture radars may provide useful imagery in relatively poor lighting conditions, such as during nighttime or periods of inclement weather. Synthetic aperture radars may also generate useful imagery of objects through walls or other opaque objects that would be relatively difficult for conventional photographic devices to attain.

Information provided by synthetic aperture radars may be useful for intelligence surveillance and reconnaissance activities. Known implementations of synthetic aperture radars have been used for military purposes to track enemy movements or other reconnaissance activities on a relatively large scale. For this reason, synthetic aperture radars are often implemented on relatively large platforms, such as ships or aircraft, that are configured to scan relatively large regions for enemy movement. Terrorism has changed the context of wartime surveillance, however, in that enemy movement may be confined to the movement or actions of one or a few people. Thus, surveillance using synthetic aperture radars configured on relatively large platforms, such as aircraft or ships, may not be suitable for combating terrorism in which war may be waged on a relatively smaller scale.

Figure 1:
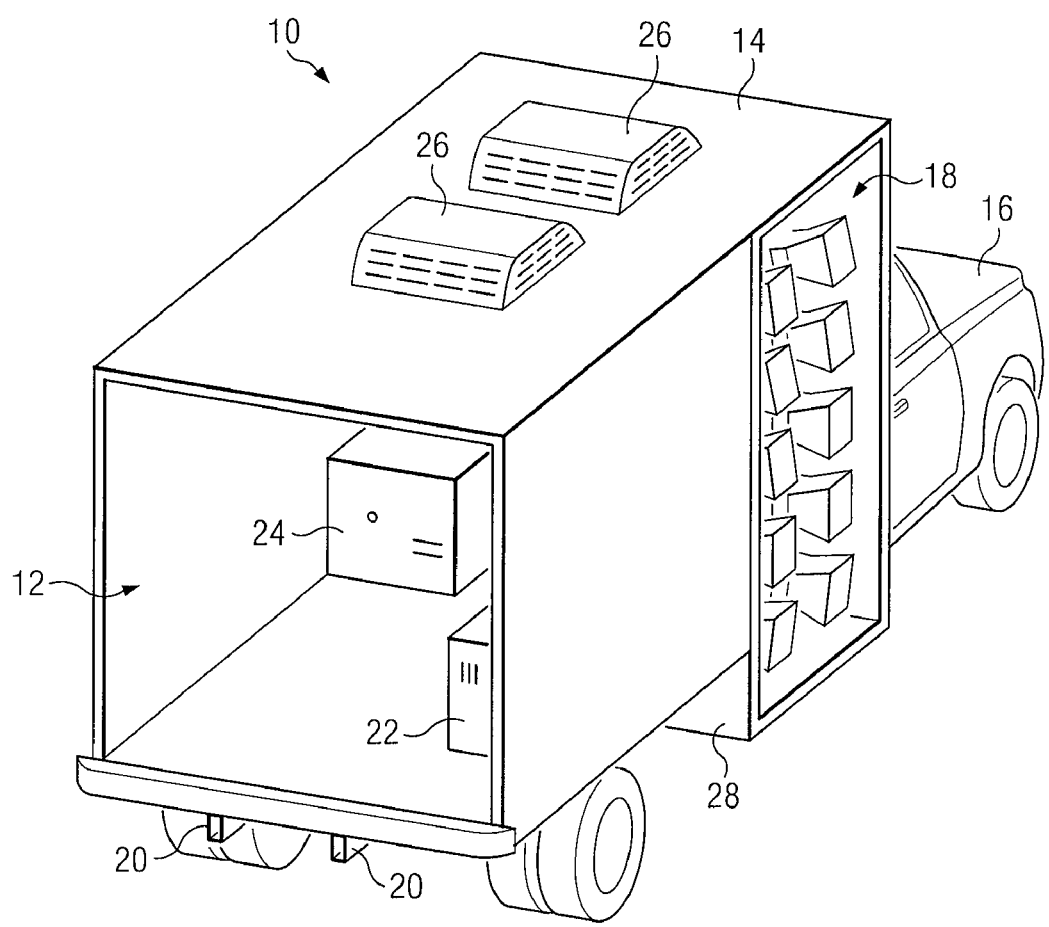
FIG. 1 is a right perspective view showing one embodiment of a vehicular surveillance system according to the teachings of the present disclosure in which the rear wall and radome of the enclosure are removed to reveal the various elements of a synthetic aperture radar housed inside.
Figure 2:
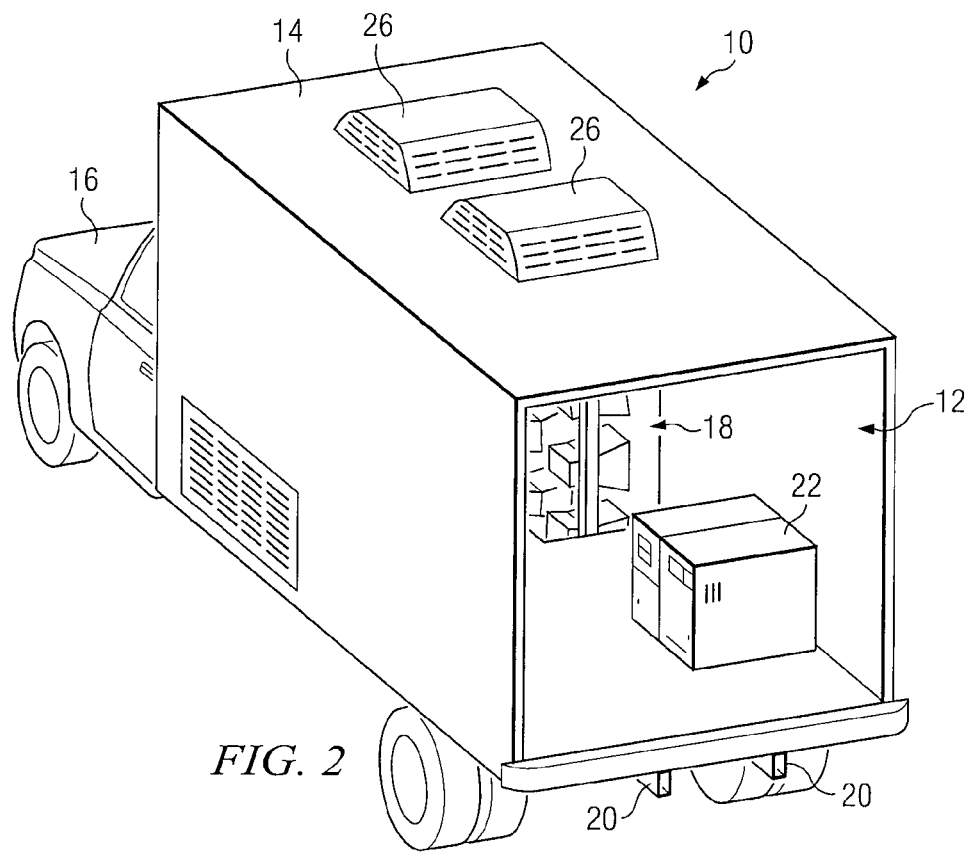
FIG. 2 is a left perspective view of the vehicular surveillance system of FIG. 1.
Figure 3:
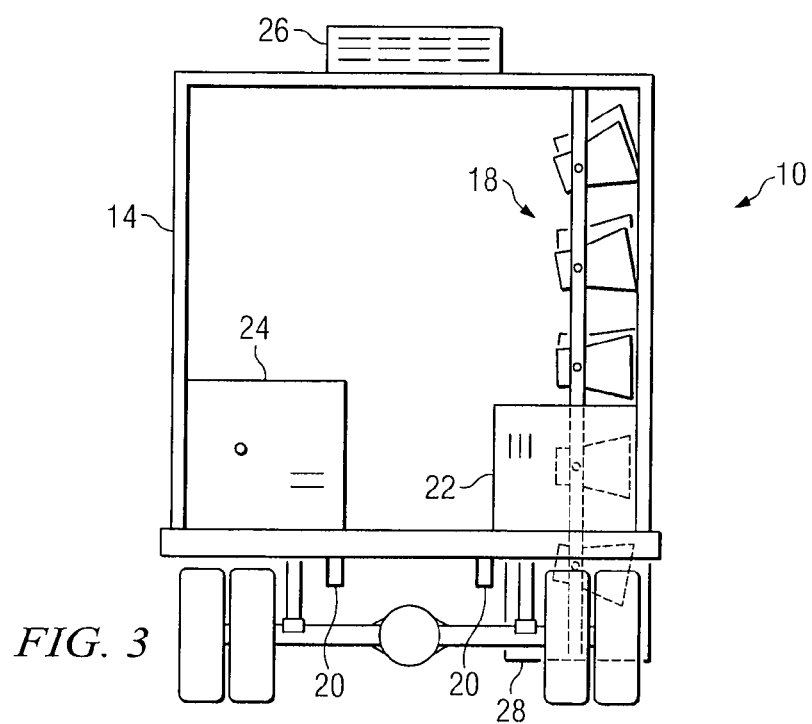
FIG. 3 is a rear elevational view of the vehicular surveillance system shown with the rear wall of the enclosure removed to reveal the various elements of the synthetic aperture radar housed inside.

FIGS. 1, 2, and 3 show one embodiment of a vehicular surveillance system 10 that may provide a solution to this problem and other problems. Vehicular surveillance system 10 includes a synthetic aperture radar 12 housed in an enclosure 14 that is coupled to a land vehicle 16. Synthetic aperture radar 12 has an antenna array 18 that transmits and receives electro-magnetic radiation for generation of images around land vehicle 16. According to the teachings of the present disclosure, vehicular surveillance system 10 may be used to gather intelligence surveillance and reconnaissance information from any object, such as a building or other structure that may be in the vicinity of land vehicle 16.

Certain embodiments incorporating a land vehicle mounted synthetic aperture radar 12 may provide enhanced information over other known intelligence surveillance and reconnaissance gathering mechanisms. For example, aircraft or sea-going vessel mounted synthetic aperture radars may be ill-suited to gather intelligence surveillance and reconnaissance information of relatively small operations, such as a small band of terrorists that are hiding in a building. Surveillance cameras that generate imagery using visible light may also be limited to visual imagery that may be visually seen on the exterior surface of the building. Vehicular surveillance system 10 may therefore, provide enhanced surveillance techniques for intelligence surveillance and reconnaissance gathering purposes in some embodiments.

In the particular embodiment shown, enclosure 14 is configured on a land vehicle 16; however, enclosure 14 may include any self-contained configuration that houses the various components of a synthetic aperture radar 12 for generating imagery around its vicinity. Land vehicle 16 may be any type of vehicle that travels over the ground, such as a pickup, an automobile, an armored tank, an armored personnel carrier (APC), a tractor trailer, or the like. In the particular embodiment shown, land vehicle 16 is a one ton truck having a load bearing capacity of approximately 1 ton. In other embodiments, land vehicle 16 may be a relatively large truck, such as a tractor trailer that is adapted to pull a semi-trailer using a fifth-wheel tandem hitch.

Land vehicle 16 is coupled to enclosure 14 for housing the various elements of synthetic aperture radar 12. Enclosure 14 includes a generally box-shaped structure that is rigidly coupled to a frame portion 20 of land vehicle 16. The particular enclosure shown is approximately 20 feet in length, approximately 8 feet wide, and approximately 9 feet tall. The various elements of synthetic aperture radar 12 may include an antenna array 18, a computing system 22, an electrical power generator 24, and a climate control system 26. Computing system 22 generates synthetic aperture radar imagery from signals received by antenna array 18. Electrical power generator 24 uses a suitable liquid fuel, such as petroleum, to generate electrical power for operating synthetic aperture radar 12. For the synthetic aperture radar implementation shown, electrical power generator 24 has a rated power generating capacity of approximately 12 kilo-Watts and is thermally insulated to reduce conduction of heat into enclosure 14. Climate control system 26 may include an air conditioning system that is configured to remove unwanted heat from enclosure 14 and may have a cooling capacity rating of approximately 15,000 British thermal units (BTUs).

Antenna array 18 includes a plurality of antenna elements that are arranged in a plurality of columns. Antenna elements generate signals suitable for generation of synthetic aperture radar imagery by transmitting and receiving multiple electro-magnetic pulses over spatially separated distances. For this reason, synthetic aperture radar imagery is obtained while land vehicle 16 is in motion. Spatial separation along the vertical axis, however, may vary relatively little due to the inherent lateral movement of land vehicle 16 over the surface of the ground. It may be beneficial, therefore, to provide columns of antenna elements that have relatively good vertical spatial separation. Thus in one embodiment, vertical spatial separation of antenna elements may be enhanced by incorporation of a drop-down box 28 configured on enclosure 14. Drop-down box 28 forms a cavity for placement of at least a portion of antenna elements of antenna array 18.

Figure 4:
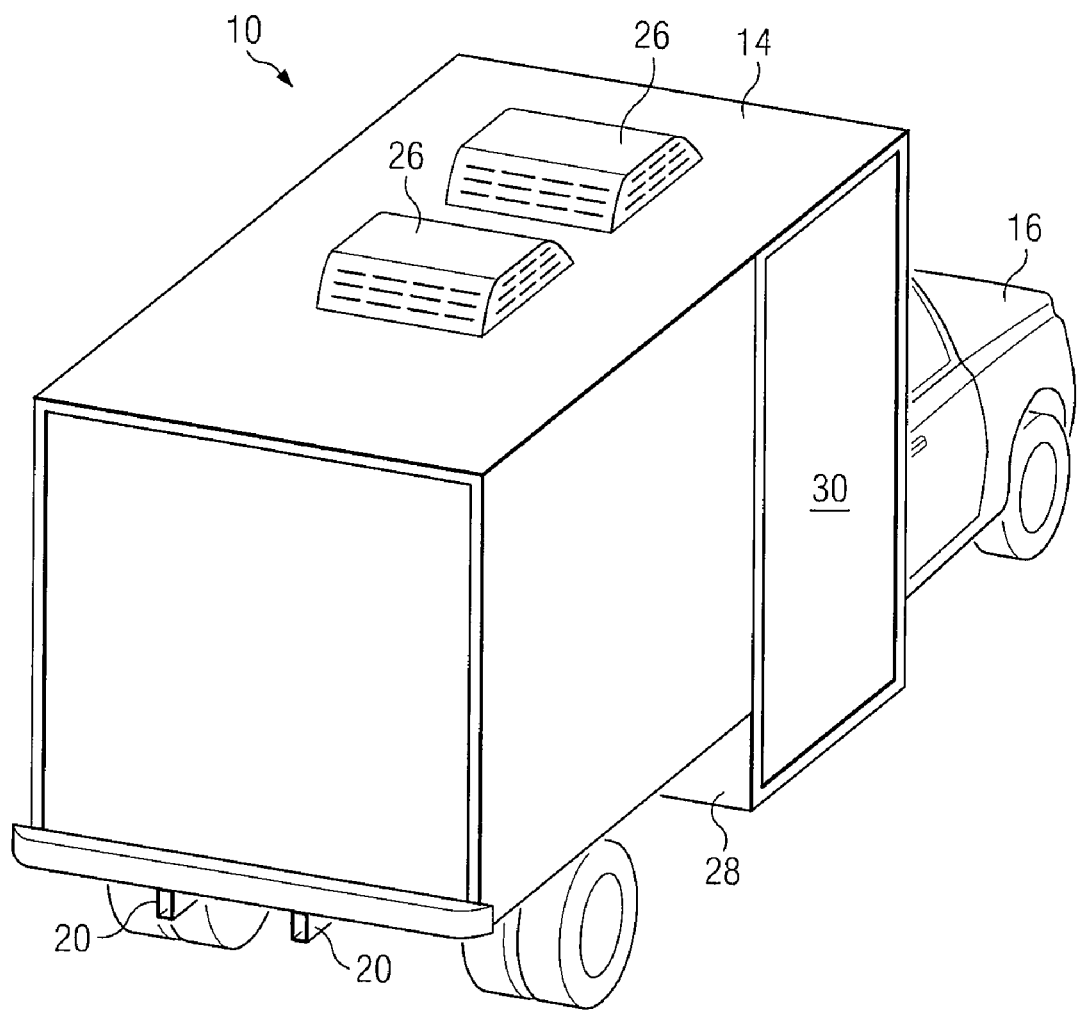
FIG. 4 is another perspective view of the vehicular surveillance system of FIG. 1 showing a radome configured on a portion of enclosure.

FIG. 4 is another perspective view of vehicular surveillance system 10 showing a radome 30 configured on a portion of enclosure 14. Antenna elements transmit and receive electro-magnetic radiation that is propagated through a portion of enclosure 14. For this reason, radome 30 may be configured on a portion of enclosure 14 to provide a propagation path for electro-magnetic radiation through enclosure 14. Radome 30 may be formed of any suitable material, such as a fiberglass composite material, that is generally rigid in consistency, waterproof, and has good insulative properties for propagation of electro-magnetic radiation. In one embodiment, radome 30 is formed of at least two polyurethane sheets overlying a honeycomb-shaped core. The outer surface of radome 30 may have visual characteristics that are matched to those of the enclosure 14. Radome 30 may therefore allow electro-magnetic radiation to propagate freely while concealing the antenna array 18 configured inside enclosure 14.

The outer surface of enclosure 14 may have visual characteristics that may mimic the external appearance of conventional truck enclosures. In this manner, the purpose and mission of intelligence surveillance and reconnaissance activities conducted by vehicular surveillance system 10 may be concealed from others within its vicinity. The outer surface of enclosure 14 may include any visual characteristic, such as, for example, a color scheme of a conventional truck enclosure, a commercial advertisement, an illustration, and/or one or more company logos that deceptively conceal the contents of enclosure 14.

Modifications, additions, or omissions may be made to vehicular surveillance system 10 without departing from the scope of the disclosure. The components of vehicular surveillance system 10 may be integrated or separated. For example, enclosure 14 may be formed of an insulative material having properties suitable for propagation of electro-magnetic radar pulses such that radome 30 may form an integral portion of enclosure 14. Moreover, the operations of vehicular surveillance system 10 may be performed by more, fewer, or other components. For example, vehicular surveillance system 10 may include other devices useful for its operation, such as a telemetry mechanism that transmits generated images to a remote location as the images are being processed such that users of vehicular surveillance system 10 may obtain useful intelligence surveillance and reconnaissance information in real time. Additionally, operations of computing system 22 may be performed using any suitable logic comprising software, hardware, and/or other logic.

Although the present disclosure has been described with several embodiments, a myriad of changes, modifications may be suggested to one skilled in the art, and it is intended that the present disclosure encompass such changes, variations, alterations, transformation, and modifications as they fall within the scope of the appended claims.

What is claimed is:

1. A system for gathering intelligence, surveillance, and reconnaissance information comprising:
   a truck;
   an enclosure rigidly coupled to the truck, the enclosure having a shape and a visual characteristic that mimics the appearance of a conventional truck;
   a synthetic aperture radar comprising a plurality of antenna elements that transmit and receive electro-magnetic radiation, the synthetic aperture radar operable to:
      generate images of objects, using the received electro-magnetic radiation, around the truck while the truck is in motion; and
   a drop-down box coupled to the enclosure, the drop-down box forming a depression in the bottom surface of the enclosure for housing a portion of the plurality of antenna elements.

2. A system for gathering intelligence, surveillance, and reconnaissance information comprising:
   a land vehicle;
   an enclosure coupled to the land vehicle; and
   a synthetic aperture radar housed in the enclosure and comprising an antenna array that transmits and receives electro-magnetic radiation, the synthetic aperture radar operable to:
      generate images of objects, using the received electro-magnetic radiation, around the land vehicle while the land vehicle is in motion;
   wherein the antenna array comprises a plurality of antenna elements and the enclosure comprises a drop-down box coupled to the enclosure, the drop-down box forming a depression in the bottom surface of the enclosure for housing a portion of the plurality of antenna elements.

3. The system of claim 2, wherein the land vehicle comprises a truck having a frame that is rigidly coupled to the enclosure.

4. The system of claim 2, wherein the enclosure comprises an outer surface having a shape and a visual characteristic that mimics the appearance of a conventional land vehicle.

5. The system of claim 2, wherein the antenna array has a plurality of antenna elements disposed adjacent a portion of the enclosure, each of the plurality of antenna elements having a boresight axis that extends through a portion of the enclosure, the portion of the enclosure comprising a radome.

6. The system of claim 5, wherein the radome is made of at least two polyurethane sheets overlying a honeycomb-shaped core.

7. The system of claim 5, wherein the radome comprises an outer surface having a visual characteristic that matches a visual characteristic of the enclosure.

8. The system of claim 2, further comprising an electrical power generator housed in the enclosure, the electrical power generator operable to power the synthetic aperture radar.

9. The system of claim 2, further comprising a climate control apparatus configured on the enclosure, the climate control apparatus operable to control the climate within the enclosure.

10. A self-contained intelligence surveillance and reconnaissance system comprising:
   a synthetic aperture radar comprising a computing system and an antenna array operable to transmit and receive electro-magnetic radiation, the computing system operable to receive signals from the antenna array and generate images of objects using the received electro-magnetic radiation;
   an electrical power generator operable to power the synthetic aperture radar; and
   an enclosure that houses the synthetic aperture radar and the electrical power generator, the enclosure operable to be moved while the synthetic aperture radar generates the images;
   wherein the antenna array comprises a plurality of antenna elements and the enclosure comprises a drop-down box coupled to the enclosure, the drop-down box forming a depression in the bottom surface of the enclosure for housing a portion of the plurality of antenna elements.

11. The self-contained intelligence surveillance and reconnaissance system of claim 10, wherein the enclosure is rigidly coupled to a land vehicle.

12. The self-contained intelligence surveillance and reconnaissance system of claim 11, wherein the enclosure comprises an outer surface having a shape and a visual characteristic that mimics the appearance of a conventional land vehicle.

13. The self-contained intelligence surveillance and reconnaissance system of claim 10, wherein the antenna array has a plurality of antenna elements disposed adjacent a portion of the enclosure, each of the plurality of antenna elements having a boresight axis that extends through a portion of the enclosure, the portion of the enclosure comprising a radome.

14. The self-contained intelligence surveillance and reconnaissance system of claim 13, wherein the radome is made of at least two polyurethane sheets overlying a honeycomb-shaped core.

15. The self-contained intelligence surveillance and reconnaissance system of claim 13, wherein the radome comprises an outer surface having a visual characteristic that matches the visual characteristic of the enclosure.

16. The self-contained intelligence surveillance and reconnaissance system of claim 10, wherein the plurality of antenna elements are arranged in a plurality of vertically oriented columns.

17. The self-contained intelligence surveillance and reconnaissance system of claim 10, further comprising a climate control apparatus configured within the enclosure, the climate control apparatus operable to control the climate within the enclosure.

* * * * *